United States Patent
Pinchover et al.

(10) Patent No.: US 8,782,335 B2
(45) Date of Patent: Jul. 15, 2014

(54) LATENCY REDUCTION ASSOCIATED WITH A RESPONSE TO A REQUEST IN A STORAGE SYSTEM

(75) Inventors: Yishai Baruch Pinchover, Haifa (IL); Ron Mandel, Haifa (IL)

(73) Assignee: LSI Corporation, Milpitas, CA (US)

( * ) Notice: Subject to any disclaimer, the term of this patent is extended or adjusted under 35 U.S.C. 154(b) by 484 days.

(21) Appl. No.: 12/941,112

(22) Filed: Nov. 8, 2010

(65) Prior Publication Data

US 2012/0117320 A1    May 10, 2012

(51) Int. Cl.
*G06F 12/00* (2006.01)
*G06F 12/08* (2006.01)
*G06F 3/06* (2006.01)

(52) U.S. Cl.
CPC .............. *G06F 3/065* (2013.01); *G06F 3/0656* (2013.01); *G06F 2212/224* (2013.01); *G06F 12/0866* (2013.01); *G06F 3/0665* (2013.01); *G06F 3/067* (2013.01); *G06F 3/0611* (2013.01)
USPC ..................... 711/112; 711/162; 711/E12.103

(58) Field of Classification Search
USPC .................................................. 711/162, 112
See application file for complete search history.

(56) References Cited

U.S. PATENT DOCUMENTS

| | | | |
|---|---|---|---|
| 5,875,478 A * | 2/1999 | Blumenau | 711/162 |
| 2005/0097441 A1* | 5/2005 | Herbach et al. | 715/501.1 |
| 2006/0013222 A1 | 1/2006 | Rangan et al. | |
| 2010/0031080 A1* | 2/2010 | Shangguan | 714/6 |
| 2010/0122050 A1* | 5/2010 | Hutchison et al. | 711/162 |
| 2010/0281230 A1* | 11/2010 | Rabii et al. | 711/165 |

* cited by examiner

*Primary Examiner* — Larry Mackall
(74) *Attorney, Agent, or Firm* — Raj Abhynaker, P.C.

(57) ABSTRACT

A method includes segmenting a virtual volume into an active area configured to map to a first type of storage and a non-active area configured to map to a second type of storage through a storage virtualization engine. The second type of storage includes data associated with a host device and the first type of storage includes point-in-time images corresponding to the data associated with the host device. The first type of storage offers a higher performance than that of the second type of storage. The method also includes allocating a portion of space in the first type of storage to serve as a cache memory during a write operation and/or a read operation, and reducing a latency associated with the response to a write request and/or a read request through performing the corresponding write operation and/or the read operation through the first type of storage.

24 Claims, 8 Drawing Sheets

LATENCY REDUCTION ASSOCIATED WITH A RESPONSE TO A REQUEST IN A STORAGE SYSTEM

FIELD OF TECHNOLOGY

This disclosure relates generally to storage systems and, more particularly, to a method, an apparatus and/or a system of reducing latency associated with a response to a write request and/or a read request in a storage system.

BACKGROUND

A storage system may include data associated with one or more users belonging to an entity (e.g., an organization) stored in storage pools therein. A portion of the data may be accessed frequently by the one or more users and another portion of the data may be accessed less frequently by the one or more users. Additionally, the storage system may be configured to back up data associated with the one or more users therein.

When data to be frequently accessed is stored on hardware offering low performance, read/write requests thereto may be addressed with an increased response time. Moreover, when the hardware offering low performance includes data stored close to a maximum capacity thereof, the response time may be even further increased. In an example scenario, when the hardware is associated with remote storage offered as a service in a cloud storage environment, the one or more users may encounter read/write timeouts, leading to wastage of human effort and/or loss of productivity.

SUMMARY

Disclosed are a method, an apparatus and/or a system of reducing latency associated with a response to a write request and/or a read request in a storage system.

In one aspect, a method includes segmenting a virtual volume into an active area configured to map to a first type of storage and a non-active area configured to map to a second type of storage through a storage virtualization engine. The second type of storage is configured to include data associated with a host device and the first type of storage is configured to include point-in-time images corresponding to the data associated with the host device. The first type of storage offers a higher performance than that of the second type of storage, and the storage virtualization engine is configured to map the virtual volume to storage locations in the first type of storage and the second type of storage.

The method also includes allocating a portion of space in the first type of storage to serve as a cache memory during a write operation and/or a read operation in response to a corresponding write request and/or a read request through the host device, and reducing a latency associated with the response to the write request and/or the read request through performing the corresponding write operation and/or the read operation through the first type of storage. The write operation includes caching data to be written to the second type of storage at the first type of storage, and the read operation includes fetching a portion of a recently written data cached at the first type of storage or the data from the second type of storage to an appropriate cache location in the first type of storage to be read therefrom.

In another aspect, a method includes storing point-in-time images corresponding to data associated with a host device at a first type of storage and storing the data associated with the host device at a second type of storage. The second type of storage offers a lower performance compared to the first type of storage. The method also includes resynchronizing or migrating one or more point-in-time image(s) corresponding to a least recently accessed data associated with the host device to the second type of storage when a memory occupied by the point-in-time images exceeds a threshold value, and segmenting a virtual volume into an active area configured to map to the first type of storage and a non-active area configured to map to the second type of storage through a storage virtualization engine.

The storage virtualization engine is configured to map the virtual volume to storage locations in the first type of storage and the second type of storage. Further, the method includes allocating a portion of space in the first type of storage to serve as a cache memory during a write operation and/or a read operation in response to a corresponding write request and/or a read request through the host device, and performing the write operation and/or the read operation through the first type of storage. The write operation includes caching data to be written to the second type of storage at the first type of storage, and the read operation includes fetching a portion of a recently written data cached at the first type of storage or the data from the second type of storage to an appropriate cache location in the first type of storage to be read therefrom.

In yet another aspect, a storage system includes a host device configured to generate a write request and/or a read request, a first type of storage associated with the host device, and a second type of storage associated with the host device. The second type of storage offers a lower performance than that of the first type of storage. The storage system also includes a storage virtualization engine associated with storage management in the storage system configured to perform virtual volume segmentation of the first type storage and the second type of storage into an active area configured to map to the first type of storage and a non-active area configured to map to the second type of storage. The second type of storage is configured to include data associated with the host device and the first type of storage is configured to include point-in-time images corresponding to the data associated with the host device.

A user at the host device is configured to allocate a portion of space in the first type of storage to serve as a cache memory during a write operation and/or a read operation in response to the corresponding write request and/or the read request through the host device. The storage virtualization engine is configured to enable performing the write operation and/or the read operation through the first type of storage to reduce a latency associated with the response to the corresponding write request and/or the read request. During the write operation, data to be written to the second type of storage is cached at the first type of storage. During the read operation, a portion of a recently written data cached at the first type of storage or the data from the second type of storage is fetched to an appropriate cache location in the first type of storage to be read therefrom.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, an apparatus and/or a system of reducing latency associated with a response to a write request and/or a read request in a storage system. Although the present embodiments have been described with reference to specific example embodiments, it will be evident that various modifications and changes may be made to these embodiments without departing from the broader spirit and scope of the various embodiments.

Figure 1:
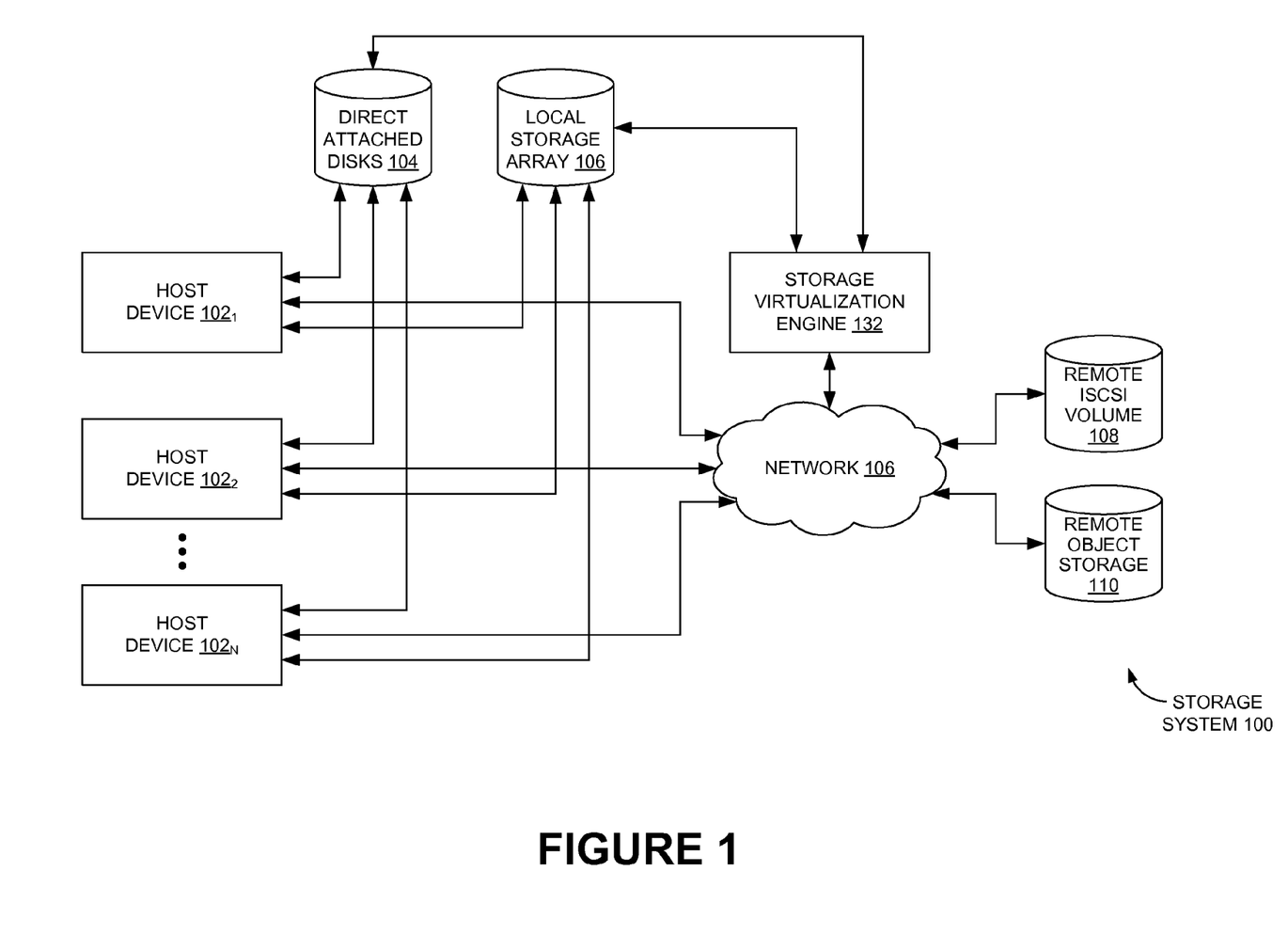
FIG. 1 is a schematic view of a storage system, according to one or more embodiments.

FIG. 1 shows a storage system 100, according to one or more embodiments. In one or more embodiments, storage system 100 may include one or more host devices (e.g., host devices $102_{1-N}$) configured to have data associated therewith stored and/or backed-up externally in one or more "storage pools." In one or more embodiments, each of the one or more storage pool(s) may be Solid-State Drive (SSD) based, Hard Disk Drive (HDD) based (access to the HDDs being based on, for example, a Fiber Channel (FC) protocol, a Serial-Attached Small Computer System Interface (SAS) protocol or a Serial Advanced Technology Attachment (SATA) protocol), remote Internet Small Computer System Interface (iSCSI) volume based, remote object storage based or a combination thereof. In one or more embodiments, the aforementioned drives may be direct attached disks 104 or a local storage array 106.

FIG. 1 shows both direct attached disks 104 and local storage array 106 as constituting drive-based storage as an illustrative example. In one or more embodiments, direct attached disks 104 and local storage array 106 may be at a same location as the one or more host devices (e.g., host devices $102_{1-N}$). FIG. 1 also shows both remote iSCSI volumes 108 and remote object storage 110 as being at a location remote from that of the one or more host devices (e.g., host devices $102_{1-N}$). In one more embodiments, remote object storage 110 may require an emulation driver associated therewith to enable viewing thereof as a block device.

In one or more embodiments, the one or more host devices (e.g., host devices $102_{1-N}$) may be configured to communicate with remote storage associated therewith (e.g., remote iSCSI volumes 108, remote object storage 110) through a computer network 120. In one or more embodiments, computer network 120 may be a Storage Area Network (SAN), a Local Area Network (LAN), a Wide Area Network (WAN), a Virtual Private Network (VPN) using communication links, for example, the Internet, or any combination thereof. In one or more embodiments, storage (e.g., direct attached disks 104, local storage array 106) associated with the one or more host devices (e.g., host devices $102_{1-N}$) may directly communicate with the one or more host devices (e.g., host devices $102_{1-N}$) as a Network Attached Storage (NAS) device or a Direct Attached Storage (DAS) device.

In the example embodiment of FIG. 1, a storage virtualized engine 132 may be coupled to computer network 120, and may be configured to flexibly allocate storage associated with the one or more host devices (e.g., host devices $102_{1-N}$) to direct attached disks 104, local storage array 106, remote iSCSI volumes 108 and remote object storage 110 and/or storage applications. LSI® Storage Virtualization Manager™ (SVM™) may be an example of storage virtualization engine 132. In one or more embodiments, storage virtualization engine 132 may enable centralized management of storage pooling in storage system 100 and virtual volume allocations therein. In one or more embodiments, storage virtualization engine 132 may be capable of monitoring a physical device coupled to computer network 120. In one or more embodiments, the physical device may be a host device (e.g., the one or more host devices $102_{1-N}$) and/or storages (e.g., direct attached disks 104, local storage array 106, remote iSCSI volumes 108 and/or remote object storage 110) configured as one or more storage pools. Storage virtualization engine 132, as used herein, may refer to hardware or software.

Thus, in the example embodiment of FIG. 1, storage virtualization engine 132 may be configured to monitor the one or more host devices (e.g., host devices $102_{1-N}$), direct attached disks 104, local storage array 106, remote iSCSI volumes 108 and/or remote object storage 110 coupled to computer network 120 through an agent associated therewith. In one example embodiment, the agent associated with storage virtualization engine 132 may be a Graphical User Interface (GUI) tool installed at the one or more host devices (e.g., host devices $102_{1-N}$). In one or more embodiments, the agent may be installed at a number of host devices, but not at all of the host devices (e.g., host devices $102_{1-N}$). In another example, the agent may solely be installed at a host device (e.g., host device $102_{1-N}$) configured to be associated with an administrator of storage system 100. In yet another example, the agent may be installed at one or more host devices (e.g., host devices $102_{1-N}$) configured to be customer(s) of storage services associated with a cloud computing environment of which storage system 100 is a part of.

In one or more embodiments, storage virtualization engine 132 may be configured to enable centralized management of storage pooling and/or virtual volume allocation associated with storage system 100. Further, in one or more embodiments, storage virtualization engine 132 may be configured to enable retrieval of volume information from a host device (e.g., host device $102_{1-N}$) associated therewith and routing of Input/Output (I/O) from the one or more host devices (e.g., host device $102_{1-N}$) directly to storage devices associated therewith in response to read/write requests.

In one or more embodiments, the one or more host devices (e.g., host device $102_{1-N}$) may support data sets associated with protocols including but not limited to Network File System (NFS) protocol, Common Internet File System (CIFS) protocol and the iSCSI protocol. In the example embodiment of FIG. 1, computer network 120 may have appropriate controllers compatible with direct attached disks 104, local storage array 106, remote iSCSI volumes 108 and remote object storage 110. For example, a Peripheral Component Interconnect (PCI) Redundant Array of Independent Disks (RAID) controller may be compatible with direct attached disks 104 and an FC/iSCSI controller may be compatible with local storage array 106 and/or remote iSCSI volumes 108.

As discussed above, remote object storage 110 may have an emulation driver associated therewith. In one example embodiment, a local block device may be emulated using the emulation driver and an Application Programming Interface (API) associated with a cloud including remote object storage 110. In another example embodiment where conventional block storage is associated with the cloud, a vendor associated with the cloud may enable an iSCSI Logical Unit Number (LUN), and then may install an appropriate software therefor.

It is obvious that storage virtualization engine 132 may also be configured to execute on storage array controllers associated with direct attached disks 104, local storage array 106, remote iSCSI volumes 108 and remote object storage 110. The aforementioned modification is well within the scope of the exemplary embodiments.

In one or more embodiments, virtual volume segmentation of a storage array associated with the one or more storage pools (e.g., direct attached disks 104, local storage array 106, remote iSCSI volumes 108, remote object storage 110) may be done through storage virtualization engine 132. In one or more embodiments, virtual volumes may be derived from a capacity of one or more constituent elements of the storage pools (e.g., direct attached disks 104, local storage array 106, remote iSCSI volumes 108, remote object storage 110). In one or more embodiments, following the virtual volume segmentation, mapping of virtual volumes to storage locations of the one or more constituent elements of the storage pools (e.g., direct attached disks 104, local storage array 106, remote iSCSI volumes 108, remote object storage 110) may be done.

In one or more embodiments, storage virtualization engine 132 may be configured to divide virtual volumes into an active area configured to map to a first type of storage associated with the storage pools and a non-active area configured to map to second type of storage associated with the storage pools. In one or more embodiments, storage virtualization engine 132 may be configured to split a data volume associated with the storage pool such that a base data volume may reside on a constituent element of the storage pools and an image data volume may reside on another constituent element of the storage pools. In one or more embodiments, a user/users at the one or more host devices (e.g., host device $102_{1-N}$) having the agent installed thereat may select the constituent element and/or the another constituent element of the storage pools. In one or more embodiments, the image data volume may include point-in-time images (e.g., Snapshots) associated with the base data volume.

Figure 2:
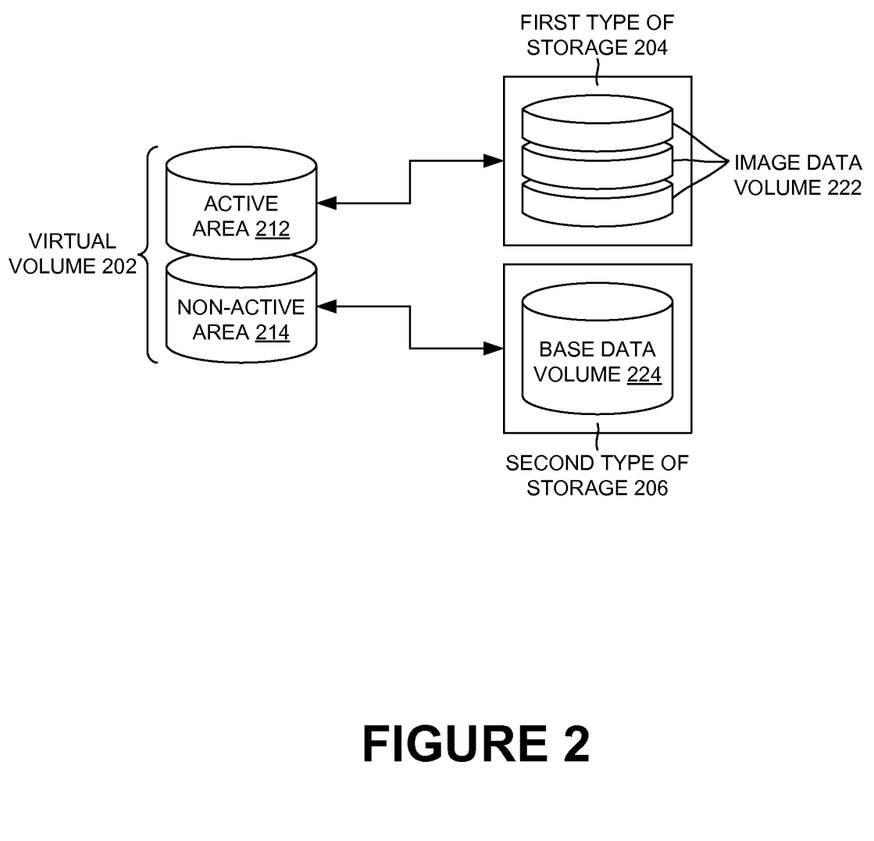
FIG. 2 is an illustrative view of a divided virtual volume, and the types of storage to which the virtual volume is mapped, according to one or more embodiments.

FIG. 2 illustrates the abovementioned divided virtual volume 202 and the types of storage (e.g., first type of storage 204, second type of storage 206) to which virtual volume 202 is mapped, according to one or more embodiments. In one or more embodiments, as discussed above, virtual volume 202 may be divided into active area 212 and non-active area 214, and the data volume (not shown) associated with the storage pools may be split into image data volume 222 and base data volume 224. In one or more embodiments, base data volume 224 may include data associated with the host device (e.g., host device $102_{1-N}$). Again as discussed above, in one or more embodiments, image data volume 222 may include the point-in-time images corresponding to the data associated with the host device (e.g., host device $102_{1-N}$).

As mentioned above, in one or more embodiments, active area 212 may be mapped to first type of storage 204 and non-active area 214 may be mapped to second type of storage 206. In one or more embodiments, storage virtualization engine 132 may be configured to enable storage of image data volume 222 on first type of storage 204 and base data volume 224 on second type of storage 206 of the storage pools. In one or more embodiments, image data volume 222 resident on first type of storage 204 may be configured to store point-in-time images associated with the data volume. In one or more embodiments, as discussed above, the aforementioned storage locations may be user-accessible.

Figure 3:
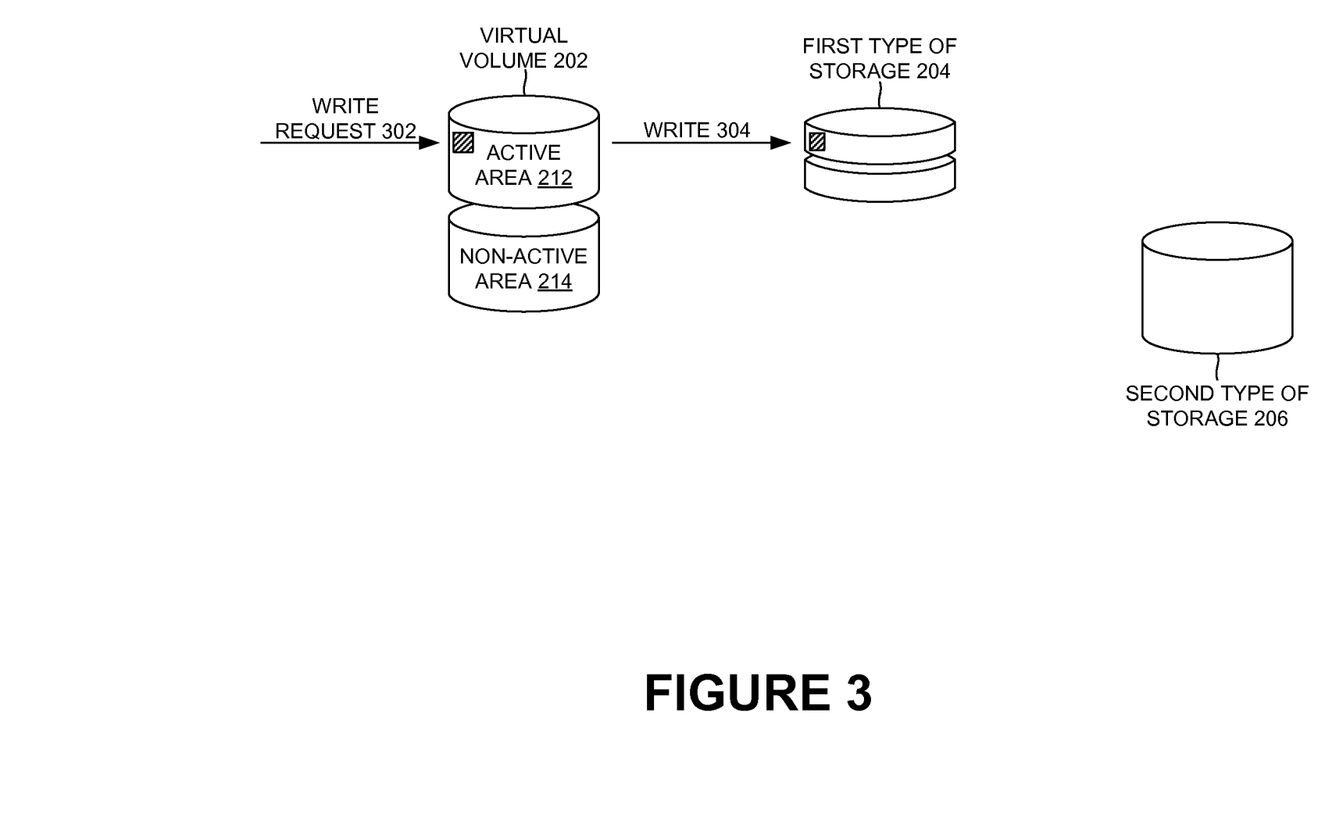
FIG. 3 is an illustrative view of a data write process, according to one or more embodiments.

In one or more embodiments, a user at a host device (e.g., host device $102_{1-N}$) may allocate some space in local storage associated therewith for caching purposes. Remote storage may be provided as a cloud service to the user. Thus, in one or more embodiments, first type of storage 204 (including image data volume 222) may include some space allocated for caching purposes, and second type of storage 206 may be remote storage. In one or more embodiments, the user may initiate a data write request from the host device (e.g., host device $102_{1-N}$) associated therewith. FIG. 3 illustrates the data write process, according to one or more embodiments. In one or more embodiments, as shown in FIG. 3, as the data write request (e.g., write request 302) originating at the host device (e.g., host device $102_{1-N}$) may be associated with active area 212, the write operation may be performed on first type of storage 204. In one or more embodiments, when first type of storage 204 is associated with higher performance than second type of storage 206, the cache allocated therein (e.g., by user) may be utilized as a write-back cache.

As shown in FIG. 3, in one or more embodiments, write operations (e.g., write 304) may be performed on first type of storage 204 having higher performance. Therefore, in one or more embodiments, all write requests (e.g., write request 302) may be addressed quickly due to write operations (e.g., write 304) being performed on fast storage (e.g., first type of storage 204). In one or more embodiments, recently written data may be readily accessible through user-allocation of space on fast storage for caching purposes.

Figure 4:
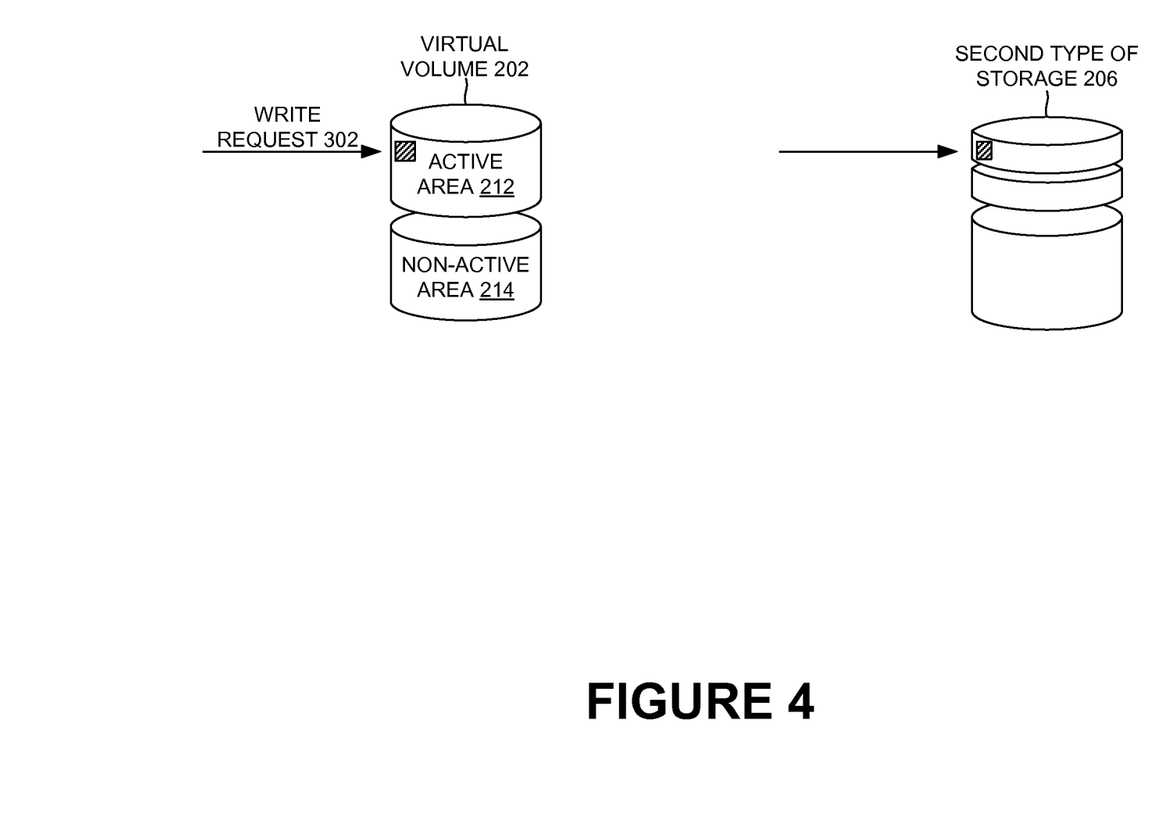
FIG. 4 is an illustrative view of writing of data from the write-back cache to the appropriate type of storage following the data write process of FIG. 3, according to one or more embodiments.

In one or more embodiments, as discussed above, first type of storage 204 now may include a write-back cache. In one or more embodiments, recently written data may be stored in the write-back cache and may be accessed therethrough. In one or more embodiments, during the idle cycles of the host device (e.g., host device $102_{1-N}$), the recently written data may be written to second type of storage 206 (e.g., to base data volume 224). In one or more embodiments, when second type of storage 206 is a remote storage, where the host device is configured to communicate therewith through computer network 120, the recently written data may be written to second type of storage 206 also taking into account conditions associated with computer network 120 (e.g., during optimum conditions such as high bandwidth availability, less traffic). In one or more embodiments, point-in-time image(s) of the recently written data in the write-back cache may be taken through storage virtualization engine 132 prior to writing to second type of storage 206. FIG. 4 shows the writing of data from the write-back cache to second type of storage 206.

In one or more embodiments, as discussed above, a user at a host device (e.g., host device $102_{1-N}$) may allocate some space in local storage associated therewith for caching purposes. Remote storage may be a cloud service provided to the user. Thus, in one or more embodiments, again, first type of storage 204 (including image data volume 222) may include some space allocated for caching purposes, and second type of storage 206 may be remote storage. In one or more embodiments, the user may initiate a data read request from the host device (e.g., host device $102_{1-N}$) associated therewith.

Figure 5:
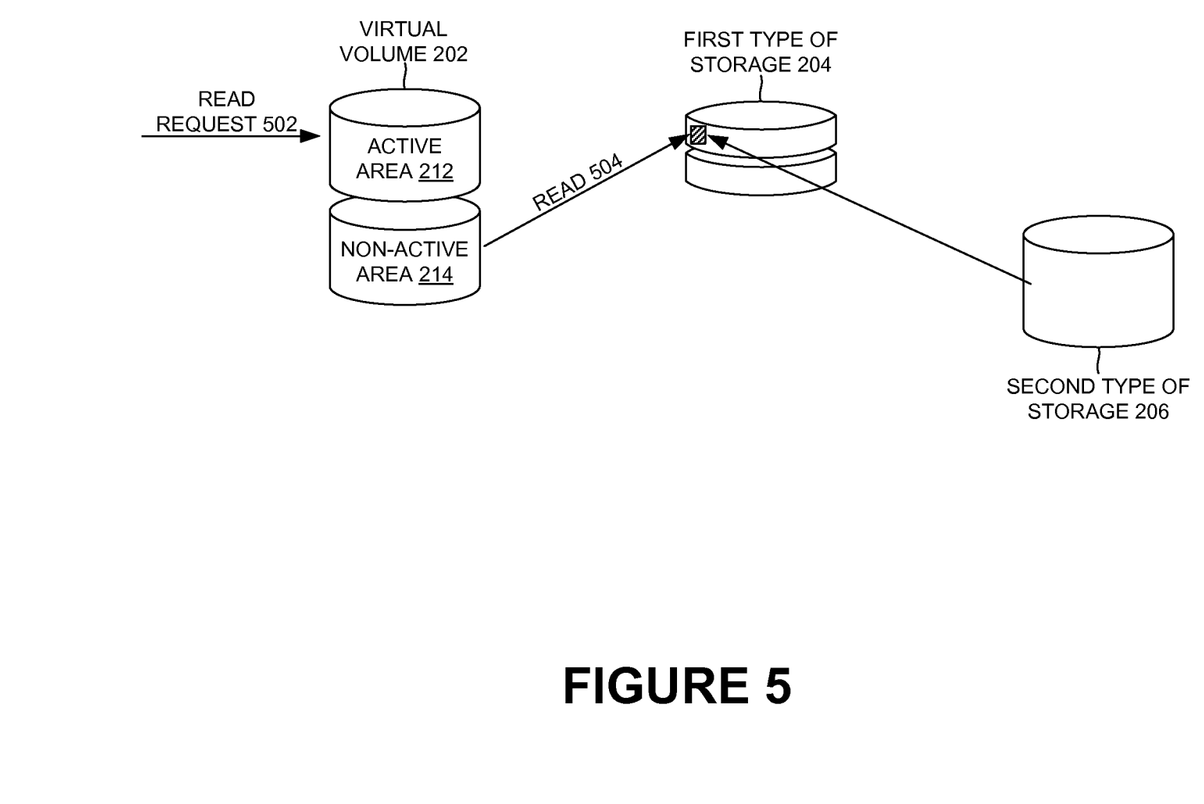
FIG. 5 is an illustrative view of a data read process, according to one or more embodiments.

FIG. 5 illustrates a data read process, according to one or more embodiments. In one or more embodiments, at least in response to the read request (e.g., read request 502), storage virtualization engine 132 may be configured to initialize maps associated with the point-in-time images stored in image data volume 222 to indicate a "no permission" status, instead of "read-only." Therefore, in one or more embodiments, read request 502 may fault due to the aforementioned "no permission" status. In one or more embodiments, read request 502 may be directed to reading (e.g., read 504) from base data volume 224 or to reading recently written data to the cache of image data volume 222. In one or more embodiments, as the read request faults, storage virtualization engine 132 may be configured to enable copying an appropriate portion of data from base data volume 224 or image data volume 222, regardless of the mapping of the aforementioned portion to active area 212 or non-active area 214 of virtual volume 202.

In one or more embodiments, the space in base data volume 224 or image data volume 222 from which the appropriate portion of data is copied may then be marked as unused. Therefore, in one or more embodiments, if the appropriate portion of data is copied from base data volume 224, the appropriate portion of data may be fetched to the cache location in first type of storage 204 from base data volume 224. In one or more embodiments, if the appropriate portion of data is copied from image data volume 222, the appropriate portion of data may be fetched to the appropriate cache location in first type of storage 204 from image data volume 222. In one or more embodiments, point-in-time images may be arranged from top to bottom in image data volume 222 in an order of recency of creation/data access through storage virtualization engine 132. The most recently accessed data corresponds to the top location in image data volume 222 and the least recently accessed data corresponds to the bottom location in image data volume 222.

In one or more embodiments, thus, the location allocated for caching may be utilized as a read cache. In one or more embodiments, regardless of the location (e.g., base data volume 224, lower portions of image data volume 222) of the data to be read, the data may be brought on top of image data volume 222 to be read therein. Thus, in one or more embodiments, recently read areas (e.g., portions of data) on the storage pools may be accessed with the performance of first type of storage 204, which may have higher performance compared to second type of storage 206. In one or more embodiments, repeated access to the same areas may further enhance performance due to the read-cache. In one or more embodiments, the portion of the recently written data cached at first type of storage 204 or the data from second type of storage 206 may be released to the original location therein after successful completion of the read operation.

Thus, in one or more embodiments, recently accessed areas in the storage pools may be mapped to first type of storage 204, regardless of the locations therein. In one or more embodiments, when point-in-time images are frequently (e.g., periodically) created, the bottom location of image data volume 222 may hold the point-in-time image(s) of the least recently used data and top location of image data volume 222 may hold the point-in-time image(s) of the most recently used data. Therefore, in one or more embodiments, deletion (or, resynchronization) associated with the bottom point-in-time image(s) may discard the least recent data from image data volume 222. In one or more embodiments, data associated with the discarded point-in-time image(s) in image data volume 222 may be resynchronized to the original data corresponding thereto at base data volume 224.

Figure 6:
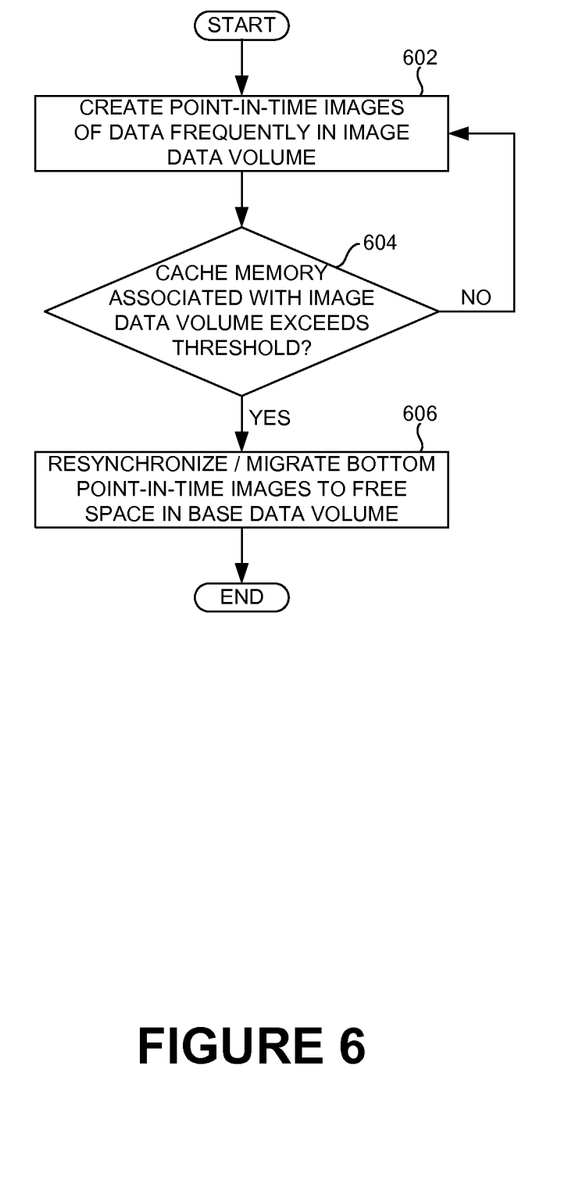
FIG. 6 is a flowchart detailing the operations involved in implementing a Least Recently Used (LRU) cache associated with the image data volume of FIG. 2, according to one or more embodiments.

In one or more embodiments, the least recent point-in-time image(s) may be migrated to base data volume 224 instead of being deleted at image data volume 222. FIG. 6 shows a flowchart detailing the operations involved in implementing a Least Recently Used (LRU) cache associated with image data volume 222, according to one or more embodiments. In one or more embodiments, operation 602 may involve creating point-in-time images of data frequently (e.g., periodically) in image data volume 222. In one or more embodiments, operation 604 may involve checking as to whether the cache memory associated with image data volume 222 exceeds a threshold value. In one or more embodiments, if yes, operation 606 may involve resynchronizing/migrating the bottom point-in-time image(s) to free space in base data volume 224. In one or more embodiments, if no, control may pass to operation 602.

Thus, in one or more embodiments, volume on two storage pools may be allocated (e.g., through a user at a host device (e.g., host device $102_{1-N}$)) such that a fast storage capacity (e.g., first type of storage 204) may be utilized for cache purposes and a slow storage capacity (e.g., second type of storage 206) may be utilized to store most of the data. In one or more embodiments, latency associated with read requests and write requests in storage system 100 incorporating the abovementioned technique may be reduced. In one or more embodiments, virtual volume 202 may be defined through storage virtualization engine 132 on a certain storage space, with the point-in-time images being stored on a different storage space having better performance. Thus, in one or more embodiments, storage associated with the point-in-time images may be utilized as a cache to the rest of the data. In one or more embodiments, storage virtualization engine 132 may manage transfer of data in and out of the aforementioned cache to provide for improved performance.

Figure 7:
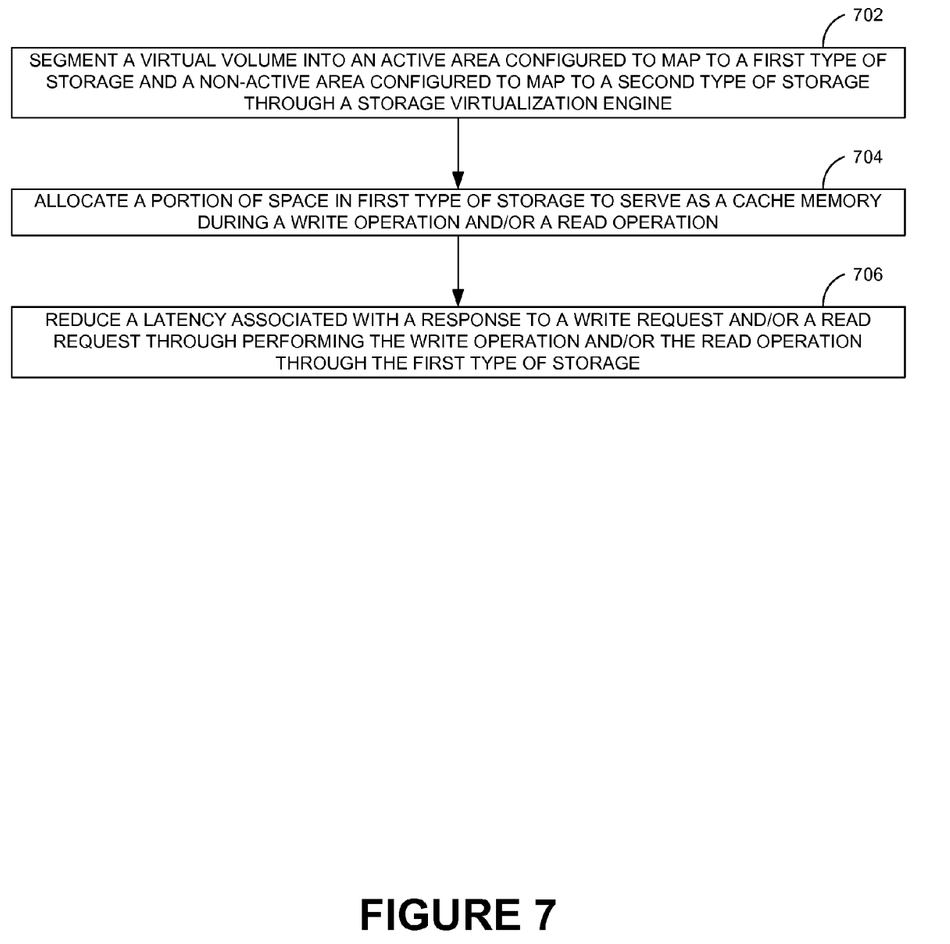
FIG. 7 is a process flow diagram detailing the operations involved in a method of reducing latency associated with a write request and/or a read request in the storage system of FIG. 1, according to one or more embodiments.

FIG. 7 shows a process flow diagram detailing the operations involved in a method of reducing latency associated with a response to a write request and/or a read request in storage system 100, according to one or more embodiments. In one or more embodiments, operation 702 includes segmenting virtual volume 202 into active area 212 configured to map to first type of storage 204 and non-active area 214 configured to map to second type of storage 206 through storage virtualization engine 132. In one or more embodiments, second type of storage 206 may be configured to include data associated with a host device and first type of storage 204 may be configured to include point-in-time images corresponding to the data associated with the host device. In one or more embodiments, first type of storage 204 may offer a higher performance than that of second type of storage 204, and storage virtualization engine 132 may be configured to map virtual volume 202 to storage locations in first type of storage 204 and second type of storage 206.

In one or more embodiments, operation 704 may include allocating a portion of space in first type of storage 204 to serve as a cache memory during a write operation and/or a read operation in response to a corresponding write request and/or a read request through the host device. In one or more embodiments, operation 706 may include reducing a latency associated with the response to the write request and/or the read request through performing the corresponding write operation and/or the read operation through first type of storage 204. In one or more embodiments, the write operation includes caching data to be written to second type of storage 206 at first type of storage 204, and the read operation includes fetching a portion of a recently written data cached at first type of storage 204 or the data from second type of storage 206 to an appropriate cache location in first type of storage 204 to be read therefrom.

Figure 8:
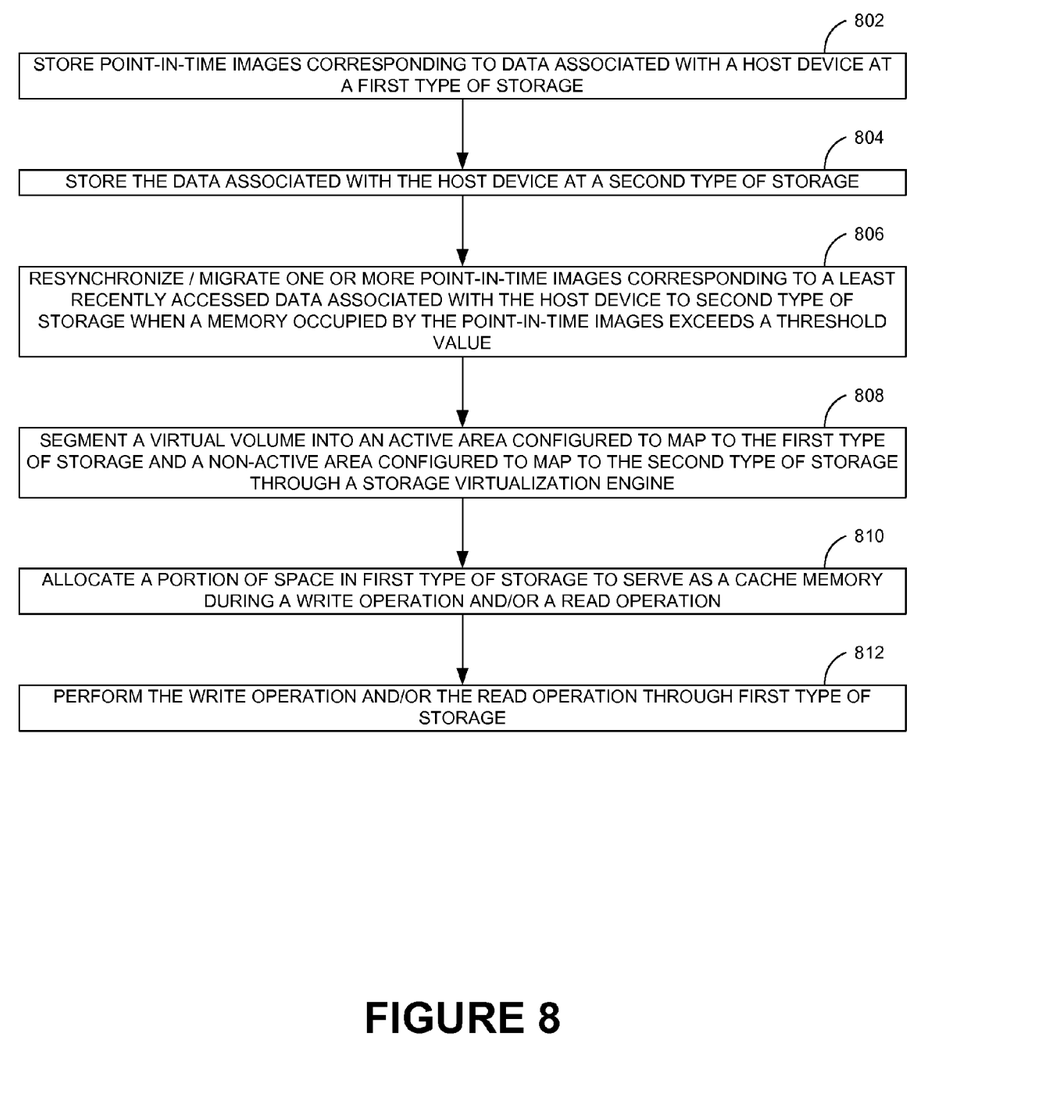
FIG. 8 is a process flow diagram detailing the operations involved in performing a write operation and/or a read operation in the storage system of FIG. 1, according to one or more embodiments.

FIG. 8 shows a process flow diagram detailing the operations involved in performing a read operation and/or a write operation in storage system 100, according to one or more embodiments. In one or more embodiments, operation 802 may involve storing point-in-time images corresponding to data associated with a host device at first type of storage 204. In one or more embodiments, operation 804 may involve storing the data associated with the host device at second type of storage 206. In one or more embodiments, second type of storage 206 may offer a lower performance than that of first type of storage 204.

In one or more embodiments, operation 806 may involve resynchronizing or migrating one or more point-in-time image(s) corresponding to a least recently accessed data associated with the host device to second type of storage 206 when a memory occupied by the point-in-time images exceeds a threshold value. In one or more embodiments, operation 808 may involve segmenting virtual volume 202 into active area 212 configured to map to first type of storage 204 and non-active area 214 configured to map to second type of storage 206 through storage virtualization engine 132. In one or more embodiments, storage virtualization engine 132 may be configured to map virtual volume 202 to storage locations in first type of storage 204 and second type of storage 206.

In one or more embodiments, operation 810 may involve allocating a portion of space in first type of storage 204 to serve as a cache memory during the write operation and/or the read operation in response to a corresponding write request and/or a read request through the host device. In one or more embodiments, operation 812 may then involve performing the write operation and/or the read operation through first type of storage 204. In one or more embodiments, the write operation includes caching data to be written to second type of storage 206 at first type of storage 204, and the read operation includes fetching a portion of a recently written data cached at first type of storage 204 or the data from second type of storage 206 to an appropriate cache location in first type of storage 204 to be read therefrom.

Although the present embodiments have been described with reference to specific example embodiments, it will be evident that various modifications and changes may be made to these embodiments without departing from the broader spirit and scope of the various embodiments. Also, for example, the various devices and modules described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A method comprising:
    segmenting a virtual volume into an active area configured to map to a first type of storage and a non-active area configured to map to a second type of storage through a storage virtualization engine, the second type of storage configured to include data associated with a host device and the first type of storage configured to include point-in-time images corresponding to the data associated with the host device, the first type of storage being a faster type than the second type of storage the first type of storage and the second type of storage both being in an active state, and the storage virtualization engine being configured to map the virtual volume to storage locations in the first type of storage and the second type of storage;
    allocating a portion of space in the first type of storage to serve as a cache memory during both a write operation and a read operation in response to a corresponding write request and a read request through the host device;
    initializing, through the storage virtualization engine, read-only maps associated with the point-in-time images in the first type of storage to indicate a "no permission" status in response to the read request such that the read request faults;
    enabling copying, through the storage virtualization engine, an appropriate portion of data from both the first type of storage and the second type of storage regardless of the mapping thereof to the active area or the non-active area following the faulting of the read request in accordance therewith, the appropriate portion of data being resident in one of the first type of storage and the second type of storage; and
    reducing a latency associated with the response to the write request and the read request through performing the write operation and the read operation solely through the first type of storage, the write operation including caching data to be written to the second type of storage at the first type of storage, and the read operation including fetching the appropriate portion of data to an appropriate cache location in the first type of storage to be read therefrom regardless of whether the appropriate portion of data is copied from the second type of storage or the first type of storage.

2. The method of claim 1, further comprising creating the point-in-time images corresponding to the data associated with the host device periodically at the first type of storage through the storage virtualization engine.

3. The method of claim 1, further comprising arranging the point-in-time images in the first type of storage in an order of recency of data access.

4. The method of claim 3, further comprising:
    one of resynchronizing and migrating at least one point-in-time image corresponding to a least recently accessed data associated with the host device to the second type of storage when a memory occupied by the point-in-time images exceeds a threshold value.

5. The method of claim 1, further comprising releasing the appropriate portion of data to an original location thereof after successful completion of the read operation.

6. The method of claim 1, further comprising writing the cached data at the first type of storage to the second type of storage during an idle cycle of the host device.

7. The method of claim 1, wherein the first type of storage is local storage associated with the host device and the second type of storage is remote storage associated with the host device.

8. The method of claim 7, wherein the first type of storage is one of direct attached disks and a local storage array, and the second type of storage is one of direct attached disks, a local storage array, a remote Internet Small Computer System Interface (iSCSI) volume and remote object storage.

9. The method of claim 7, wherein the host device is coupled to the second type of storage through a computer network.

10. A method comprising:
storing point-in-time images corresponding to data associated with a host device at a first type of storage;
storing the data associated with the host device at a second type of storage, the second type of storage being a slower type than the first type of storage, and the first type of storage and the second type of storage both being in an active state;
one of resynchronizing and migrating at least one point-in-time image corresponding to a least recently accessed data associated with the host device to the second type of storage when a memory occupied by the point-in-time images exceeds a threshold value;
segmenting a virtual volume into an active area configured to map to the first type of storage and a non-active area configured to map to the second type of storage through a storage virtualization engine, the storage virtualization engine being configured to map the virtual volume to storage locations in the first type of storage and the second type of storage;
allocating a portion of space in the first type of storage to serve as a cache memory during both a write operation and a read operation in response to a corresponding write request and a read request through the host device;
initializing, through the storage virtualization engine, read-only maps associated with the point-in-time images in the first type of storage to indicate a "no permission" status in response to the read request such that the read request faults;
enabling copying, through the storage virtualization engine, an appropriate portion of data from both the first type of storage and the second type of storage regardless of the mapping thereof to the active area or the non-active area following the faulting of the read request in accordance therewith, the appropriate portion of data being resident in one of the first type of storage and the second type of storage; and
performing the write operation and the read operation solely through the first type of storage, the write operation including caching data to be written to the second type of storage at the first type of storage, and the read operation including fetching the appropriate portion of data to an appropriate cache location in the first type of storage to be read therefrom regardless of whether the appropriate portion of data is copied from the second type of storage or the first type of storage.

11. The method of claim 10, wherein the host device is coupled to the second type of storage through a computer network.

12. The method of claim 10, further comprising arranging the point-in-time images in the first type of storage in an order of recency of data access.

13. The method of claim 10, further comprising releasing the appropriate portion of data to an original location therein thereof after successful completion of the read operation.

14. The method of claim 10, further comprising writing the cached data at the first type of storage to the second type of storage during an idle cycle of the host device.

15. The method of claim 10, wherein the first type of storage is local storage associated with the host device and the second type of storage is remote storage associated with the host device.

16. A storage system comprising:
a host device configured to generate a write request and a read request;
a first type of storage associated with the host device;
a second type of storage associated with the host device, the second type of storage being a slower type than the first type of storage, and the first type of storage and the second type of storage both being in an active state; and
a storage virtualization engine associated with storage management in the storage system configured to perform virtual volume segmentation of the first type storage and the second type of storage into an active area configured to map to the first type of storage and a non-active area configured to map to the second type of storage, the second type of storage configured to include data associated with the host device and the first type of storage configured to include point-in-time images corresponding to the data associated with the host device,
wherein a user at the host device is configured to allocate a portion of space in the first type of storage to serve as a cache memory during both a write operation and a read operation in response to a corresponding write request and the read request through the host device,
wherein the storage virtualization engine is configured to:
initialize read-only maps associated with the point-in-time images in the first type of storage to indicate a "no permission" status in response to the read request such that the read request faults;
enable copying an appropriate portion of data from both the first type of storage and the second type of storage regardless of the mapping thereof to the active area or the non-active area following the faulting of the read request in accordance therewith, the appropriate portion of data being resident in one of the first type of storage and the second type of storage, and
enable performing the write operation and the read operation solely through the first type of storage to reduce a latency associated with the response to the corresponding write request and the read request,
wherein, during the write operation, data to be written to the second type of storage is cached at the first type of storage, and
wherein, during the read operation, the appropriate portion of data is fetched to an appropriate cache location in the first type of storage to be read therefrom regardless of whether the appropriate portion of data is copied from the second type of storage or the first type of storage.

17. The storage system of claim 16, wherein the storage virtualization engine is further configured to create the point in time images corresponding to the data associated with the host device periodically at the first type of storage.

18. The storage system of claim 16, wherein the storage virtualization engine is further configured to arrange the point-in-time images in the first type of storage in an order of recency of data access.

19. The storage system of claim 18, wherein the storage virtualization engine is further configured to:
one of resynchronize and migrate at least one point-in-time image corresponding to a least recently accessed data associated with the host device to the second type of storage when a memory occupied by the point-in-time images exceeds a threshold value.

20. The storage system of claim 16, wherein the appropriate portion data is released to an original location thereof after successful completion of the read operation.

21. The storage system of claim 16, wherein the cached data at the first type of storage is written to the second type of storage during an idle cycle of the host device.

22. The storage system of claim 16, wherein the first type of storage is local storage associated with the host device and the second type of storage is remote storage associated with the host device.

23. The storage system of claim 22, wherein the first type of storage is one of direct attached disks and a local storage array, and the second type of storage is one of direct attached disks, a local storage array, a remote iSCSCI volume and remote object storage.

24. The storage system of claim 22, wherein the storage system further includes a computer network configured to couple the second type of storage to the host device.

\* \* \* \* \*